United States Patent
Fei et al.

(10) Patent No.: US 12,535,496 B2
(45) Date of Patent: Jan. 27, 2026

(54) MICROFLUIDIC DETECTION SYSTEM FOR REFRIGERATOR AND REFRIGERATOR

(71) Applicants: QINGDAO HAIER REFRIGERATOR CO., LTD., Shandong (CN); HAIER SMART HOME CO., LTD., Shandong (CN)

(72) Inventors: Bin Fei, Qingdao (CN); Haoquan Liu, Qingdao (CN); Jing Wang, Qingdao (CN); Bintang Zhao, Qingdao (CN)

(73) Assignees: QINGDAO HAIER REFRIGERATOR CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 418 days.

(21) Appl. No.: 18/246,540

(22) PCT Filed: Sep. 8, 2021

(86) PCT No.: PCT/CN2021/117215
§ 371 (c)(1),
(2) Date: Mar. 24, 2023

(87) PCT Pub. No.: WO2022/062905
PCT Pub. Date: Mar. 31, 2022

(65) Prior Publication Data
US 2023/0366906 A1  Nov. 16, 2023

(30) Foreign Application Priority Data
Sep. 27, 2020 (CN) .......................... 202011029617.8

(51) Int. Cl.
*G01N 35/10* (2006.01)
*B01L 3/00* (2006.01)
(Continued)

(52) U.S. Cl.
CPC .... *G01N 35/1095* (2013.01); *B01L 3/502715* (2013.01); *G01N 33/02* (2013.01);
(Continued)

(58) Field of Classification Search
CPC .......... G01N 35/1095; B01L 3/502715; B01L 2200/027; B01L 2300/0819
See application file for complete search history.

(56) References Cited

U.S. PATENT DOCUMENTS 11,813,611 B2 * 11/2023 Liu ........................ F25D 23/028
11,883,819 B2 * 1/2024 Zhu ........................ F25D 23/12
(Continued)

FOREIGN PATENT DOCUMENTS

BE   1004241 A7   10/1992
CN   205070014 U  *  3/2016
(Continued)

OTHER PUBLICATIONS

Supplementary European Search Report for European Patent Application No. 21871277 mailed Jan. 22, 2024 (4 pages).
(Continued)

*Primary Examiner* — Stephanie E Bloss
*Assistant Examiner* — Diana Hancock
(74) *Attorney, Agent, or Firm* — troutman pepper locke; Tim Tingkang Xia, Esq.

(57) ABSTRACT

Provided are a microfluidic detection system for a refrigerator and the refrigerator. The microfluidic detection system comprises: a microfluidic biochip that has a sample inlet, a detection pool and a communication port, all of which communicate in sequence by means of a microfluidic channel; a sample liquid driving device in sealed communication with the communication port by means of a sealed docking mechanism; and a detection mechanism for detecting the detection cell to obtain preset detection parameters of (Continued)

a sample liquid. The communication port is fixedly provided with a plug pin having an internal flow channel in sealed communication with the communication port, the plug pin is inserted into and forms a fluid-tight connection with the sealed docking mechanism, and the sealed docking mechanism is in fluid-tight connection with the sample liquid driving device, so that the sample liquid driving device is in sealed communication with the communication port.

15 Claims, 10 Drawing Sheets

(51) Int. Cl.
*F25D 23/02* (2006.01)
*G01N 33/02* (2006.01)

(52) U.S. Cl.
CPC . *B01L 2200/027* (2013.01); *B01L 2200/0689* (2013.01); *B01L 2300/0819* (2013.01); *F25D 23/028* (2013.01)

(56) References Cited

U.S. PATENT DOCUMENTS

| | | | |
|---|---|---|---|
| 2013/0284453 A1* | 10/2013 | Vick, Jr. | E21B 23/0414 |
| | | | 166/373 |
| 2016/0051983 A1* | 2/2016 | Zhuang | B01L 3/502776 |
| | | | 435/287.1 |
| 2018/0180612 A1 | 6/2018 | Simon et al. | |
| 2019/0118178 A1* | 4/2019 | Lee | B01L 3/502715 |
| 2019/0143332 A1* | 5/2019 | Yu | B01L 3/563 |
| | | | 422/503 |

FOREIGN PATENT DOCUMENTS

| | | | | |
|---|---|---|---|---|
| CN | 108801929 A | * | 11/2018 | ............. G01N 21/75 |
| CN | 109453838 A | | 3/2019 | |
| CN | 109668883 A | | 4/2019 | |
| CN | 109985677 A | | 7/2019 | |
| CN | 110252436 A | | 9/2019 | |
| CN | 209570508 U | | 11/2019 | |
| CN | 214039110 U | | 8/2021 | |
| CN | 214039111 U | | 8/2021 | |
| CN | 214039171 U | | 8/2021 | |
| CN | 214039172 U | | 8/2021 | |
| CN | 214039173 U | | 8/2021 | |
| CN | 214041434 U | | 8/2021 | |
| EP | 3075451 A1 | | 10/2016 | |
| WO | WO 2008/053660 A1 | | 5/2008 | |
| WO | WO-2016209775 A1 | * | 12/2016 | ........ G01N 33/56972 |

OTHER PUBLICATIONS

1st Office Action for European Patent Application No. 21871277 dated Feb. 5, 2024 (6 pages).
International Search Report and Written Opinion for PCT/CN2021/117215 (ISA/CN) mailed Nov. 22, 2021 w/English translation (11 pages).
SIPO, "1st CN Office Action and Search Report for CN Application No. 202011029617.8", China.

* cited by examiner

MICROFLUIDIC DETECTION SYSTEM FOR REFRIGERATOR AND REFRIGERATOR

CROSS-REFERENCE TO RELATED APPLICATIONS

The present application is a national phase entry of International Application No. PCT/CN2021/117215, filed Sep. 8, 2021, which claims priority to Chinese Application No. 202011029617.8, filed Sep. 27, 2020, which are each incorporated herein by reference in its entirety.

FIELD OF THE INVENTION

The present invention relates to refrigerating and freezing technologies, and particularly to a microfluidic detection system for a refrigerator and the refrigerator.

BACKGROUND OF THE INVENTION

With the improvement of the living standard of people, pesticide residues, viruses, nutritional elements or other aspects of some edible food materials are usually required to be detected in daily life, so as to qualitatively or quantitatively obtain the conditions of the food materials. For example, due to the pesticide abuse problem, fruits, vegetables and agricultural and sideline products purchased daily by people may have the problem of excessive pesticide residue content, and if the problem of excessive pesticide residue content of the foods cannot be found in time, great harm may be caused after people ingest the foods. For another example, currently advocated breast feeding is best feeding for infants only when breast milk has normal nutritional value, but in cases of diseases, medicine taking, surgery or other cases of the mother, the milk secreted by the mother may have reduced content of nutritional elements and even produce viruses, thereby affecting the growth and health of the infants.

Among detection methods, the method for detection by using a microfluidic biochip is rapid, the size is small, and the method is suitable for household use. In order to make sample introduction of the microfluidic biochip more accurate and easy to control, a driving device may be used to drive sample liquid into the microfluidic biochip; at this point, the quality of docking between the driving device and the microfluidic biochip directly affects the effect and accuracy of the driven sample introduction.

BRIEF DESCRIPTION OF THE INVENTION

An object of a first aspect of the present invention is to overcome at least one of the drawbacks of the prior art, and to provide a microfluidic detection system suitable for a refrigerator, which has a good sample introduction effect and realizes accurate sample introduction control.

A further object of the first aspect of the present invention is to prolong the service life of the microfluidic detection system.

Another object of the first aspect of the present invention is to improve the reliability and sealing effect of sealed docking between a microfluidic biochip and a sample liquid driving device.

An object of a second aspect of the present invention is to provide a refrigerator having the above microfluidic detection system.

According to a first aspect of the present invention, there is provided a microfluidic detection system for a refrigerator, including:
  a microfluidic biochip that has a sample inlet, a communication port and a detection pool formed therein, wherein the sample inlet, the detection pool and the communication port communicate in sequence by means of a microfluidic channel;
  a sample liquid driving device, which is in sealed communication with the communication port by means of a sealed docking mechanism, and is used to impel sample liquid in contact with the sample inlet to enter the microfluidic channel and flow to the detection pool by means of the microfluidic channel; and
  a detection mechanism, which is used for detecting the detection pool so as to obtain a preset detection parameter of the sample liquid;
  wherein the communication port of the microfluidic biochip is fixedly provided with a plug pin protruding and extending outward, an internal flow channel of the plug pin is in sealed communication with the communication port, and the plug pin is inserted into the inside of the sealed docking mechanism and forms a fluid-tight connection with the sealed docking mechanism, and the sealed docking mechanism is in fluid-tight connection with the sample liquid driving device, so that the sample liquid driving device is in sealed communication with the communication port.

Optionally, an end surface of an extended tip of the plug pin is a continuous and smooth hemispherical surface, and a pin hole of the plug pin for fluid communication with the sealed docking mechanism is formed on the circumferential side of a section of the plug pin located inside the sealed docking mechanism.

Optionally, a sealing ring for abutting contact or pressing contact with the plug pin is formed on the sealed docking mechanism, a through hole for the plug pin to pass through is formed in the middle of the sealing ring, and a sealing reinforcing rib protruding towards the radial inner side of the through hole is formed on the circumferential wall of the through hole.

Optionally, the outer wall of an end section of the plug pin for insertion into the sealed docking mechanism is tapered in an insertion direction of the plug pin; and
  the pin hole of the plug pin for fluid communication with the sealed docking mechanism is formed on the end surface of the extended tip of the plug pin.

Optionally, the plug pin is inserted into the microfluidic biochip through the communication port, and a starting end of the plug pin extending into the microfluidic biochip is open; and
  a matching interface between the plug pin and the communication port is sealed by sealing gum.

Optionally, the sealed docking mechanism is connected between the microfluidic biochip and the sample liquid driving device, a through channel penetrating through the sealed docking mechanism is formed in the sealed docking mechanism, and the sample liquid driving device and the communication port are both communicated with the through channel;
  the sample liquid driving device is provided with a connecting pipeline connected with the sealed docking mechanism, the sealed docking mechanism includes a first connecting piece and a second connecting piece which are sequentially arranged between the sample liquid driving device and the microfluidic biochip, a first connecting column and a second connecting column protruding and extending in opposite directions are formed on two opposite sides of the first connecting piece respectively, the first connecting column is inserted into the connecting pipeline, the second connecting column is inserted into the second connecting piece, and the plug pin is in insertion-connection with the second connecting piece.

Optionally, the microfluidic detection system further includes:

a chip mounting mechanism for fixing the microfluidic biochip after the plug pin and the sealed docking mechanism form a fluid-tight connection, such that the microfluidic biochip keeps a state of fluid-tight connection with the sample liquid driving device; and an elastic pressing mechanism for applying an elastic acting force to the sealed docking mechanism, such that the sealed docking mechanism is elastically and hermetically docked with the sample liquid driving device and the microfluidic biochip at the same time.

Optionally, the elastic pressing mechanism is a spring, one end of the spring abuts against a fixedly arranged end plate, the other end of the spring abuts against the sealed docking mechanism, and the end plate and the microfluidic biochip are located on two opposite sides of the sealed docking mechanism respectively, such that the spring generates the elastic acting force towards the microfluidic biochip on the sealed docking mechanism.

Optionally, the microfluidic detection system further includes:

a guide rod sleeved with the spring; and one end of the guide rod is fixedly connected with the sealed docking mechanism, and the other end of the guide rod is in contact with a Hall switch after the plug pin and the sealed docking mechanism form the fluid-tight connection, such that the Hall switch is prompted to generate a trigger signal for indicating that the microfluidic biochip is mounted in place.

Optionally, the chip mounting mechanism includes two oppositely arranged elastic clamping jaws, so as to apply opposite acting forces to the microfluidic biochip clamped between the two elastic clamping jaws; and the microfluidic detection system further includes a cantilever button which is suspended on one side of the microfluidic biochip, the cantilever button abuts against the inner sides of the two elastic clamping jaws at the same time, and acting forces which promote the elastic clamping jaws to elastically deform in directions of departing from each other are applied to the two elastic clamping jaws when the cantilever button is subjected to acting forces towards the elastic clamping jaws, so as to relieve the clamping effect of the two elastic clamping jaws on the microfluidic biochip.

Optionally, the microfluidic detection system further includes:

a sample stage for placing a sample cup, the sample cup being used for containing sample liquid;

wherein the sample stage includes a support stage for supporting the sample cup and an oscillator provided on the support stage, and the oscillator is used for oscillating the sample cup after the sample cup is placed on the support stage, such that buffer liquid and a sample in the sample cup are fully mixed to generate the sample liquid.

According to a second aspect of the present invention, there is further provided a refrigerator including the microfluidic detection system according to any one of the above-mentioned solutions.

The microfluidic detection system according to the present invention includes the sealed docking mechanism, the sealed docking mechanism and the sample liquid driving device form the fluid-tight connection, and particularly, the plug pin protruding and extending outward is fixedly connected to the communication port of the microfluidic biochip in the present invention, the internal flow channel of the plug pin is in sealed communication with the communication port, and the plug pin is inserted into the inside of the sealed docking mechanism and forms the fluid-tight connection with the sealed docking mechanism. That is, the sealed docking mechanism is simultaneously in fluid-tight connection with the sample liquid driving device and the plug pin, thus realizing a sealed communication relationship between the sample liquid driving device and the communication port of the microfluidic biochip, avoiding that the problems of air leakage, liquid leakage, or the like, are generated to influence the pressure in a main channel formed by sequential communication of the sample inlet, the detection pool and the communication port, so as to influence entrance of the sample liquid into the main channel, guaranteeing a better sample introduction effect of the microfluidic detection system, and facilitating accurate control over a sample introduction process using the sample liquid driving device.

Further, in the present application, the pin hole is formed in the circumferential side of the section of the plug pin located inside the sealed docking mechanism, the end surface of the extended tip of the plug pin is designed to be the continuous and smooth hemispherical surface, and when the microfluidic biochip is hermetically docked with the sealed docking mechanism, the contact surface between the plug pin and the sealed docking mechanism is a smooth spherical surface, such that the sealed docking mechanism cannot be scratched or punctured, the sealed docking mechanism is guaranteed to keep a good sealed docking function for a long time, and the service life of the microfluidic detection system is prolonged.

Further, the microfluidic detection system according to the present application further includes the elastic pressing mechanism, and the elastic acting force towards the microfluidic biochip can be applied to the sealed docking mechanism by the elastic pressing mechanism, such that the sealed docking mechanism is promoted to be always kept in a state of being tightly and hermetically docked with the sample liquid driving device and the microfluidic biochip at the same time, and the problems of looseness, breakage, or the like, caused by long-time use of other docking mechanisms are avoided, thereby guaranteeing a long-term and reliable fluid-tight communication relationship between the sample liquid driving device and the communication port of the microfluidic biochip, and improving the sealing effect therebetween.

According to the following detailed description of specific embodiments of the present invention in conjunction with drawings, those skilled in the art will better understand the aforementioned and other objects, advantages and features of the present invention.

BRIEF DESCRIPTION OF THE DRAWINGS

Some specific embodiments of the present invention will be described below in detail in an exemplary rather than restrictive manner with reference to the drawings. Identical reference numerals in the drawings represent identical or similar components or parts. Those skilled in the art should understand that these drawings are not necessarily drawn to scale. In the drawings.

DETAILED DESCRIPTION

The present invention firstly provides a microfluidic detection system for a refrigerator, which is used for qualitatively or quantitatively detecting a preset detection parameter of sample liquid; the preset detection parameter may be, for example, a pesticide residue parameter for indicating whether a pesticide residue content exceeds the standard and/or a specific value of the pesticide residue content, a nutrient parameter for indicating whether a nutritional element meets the standard and/or a specific content of the nutritional element, a specific substance parameter for indicating whether a specific harmful substance (for example, a specific virus) exceeds the standard and/or a specific content thereof, or the like.

Figure 1:
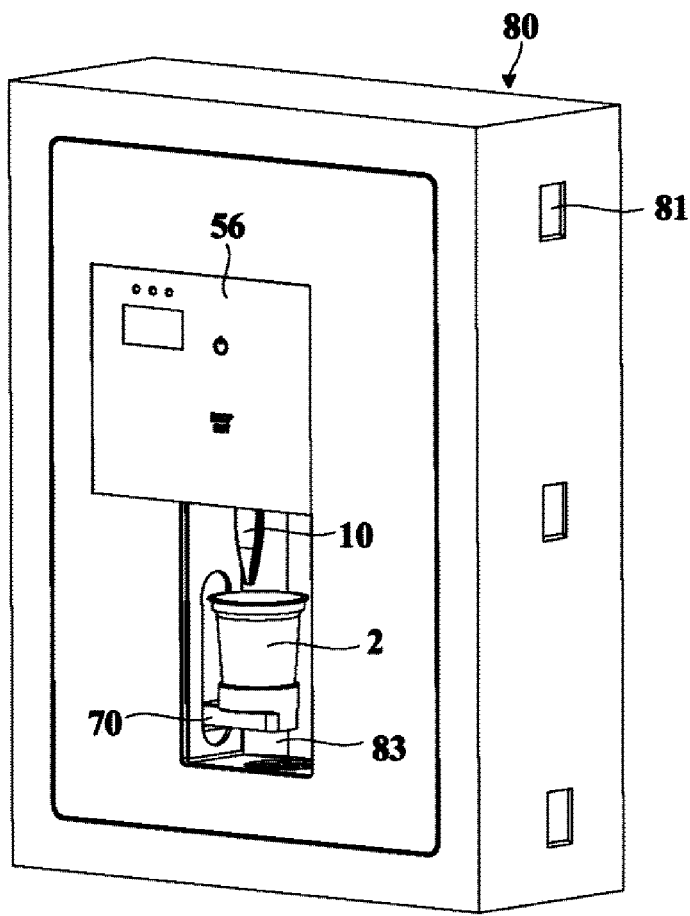
FIG. 1 is a schematic structural diagram of a microfluidic detection system for a refrigerator according to one embodiment of the present invention.
Figure 2:
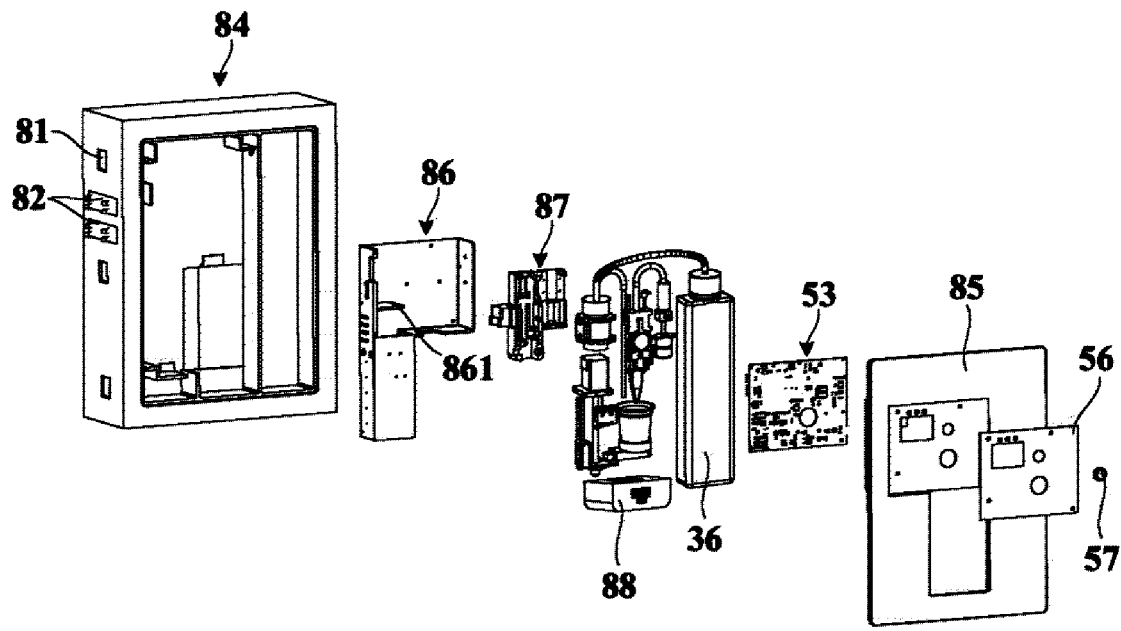
FIG. 2 is a schematic exploded structural diagram of a microfluidic detection system for a refrigerator according to one embodiment of the present invention.
Figure 3:
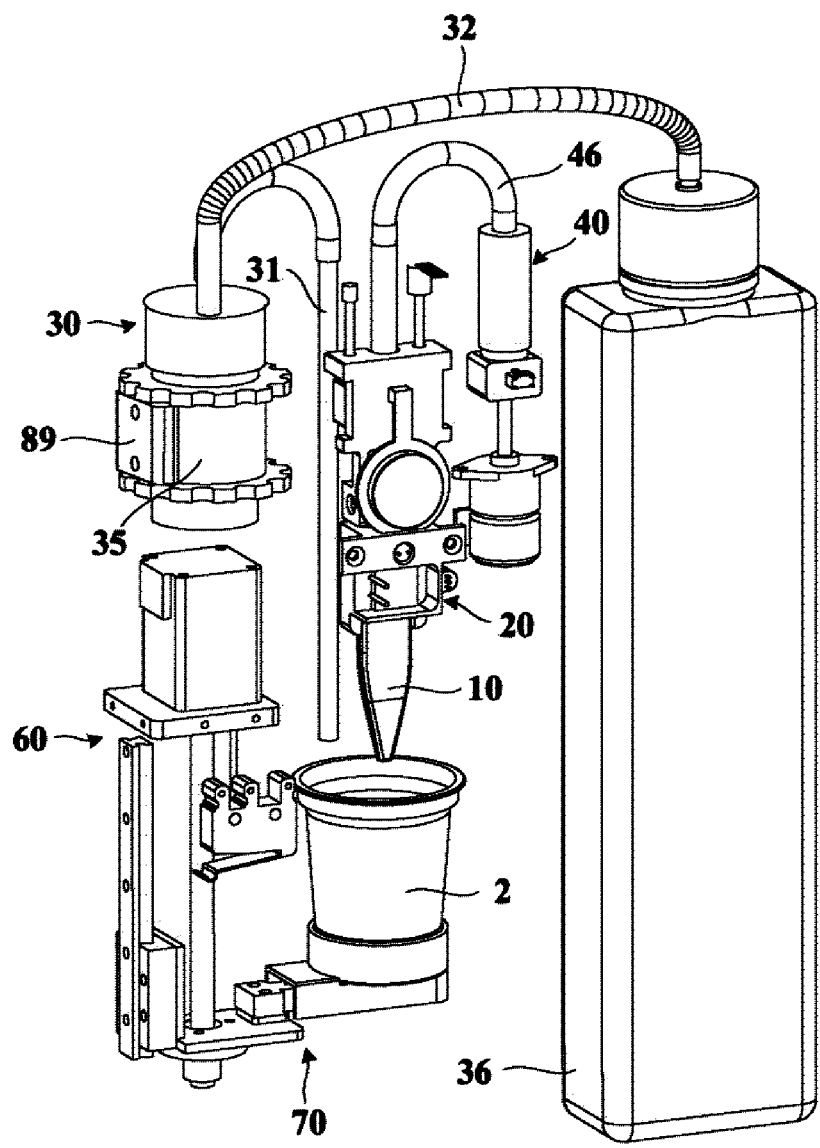
FIG. 3 is a schematic structural diagram of an internal structure of a microfluidic detection system according to one embodiment of the present invention.
Figure 4:
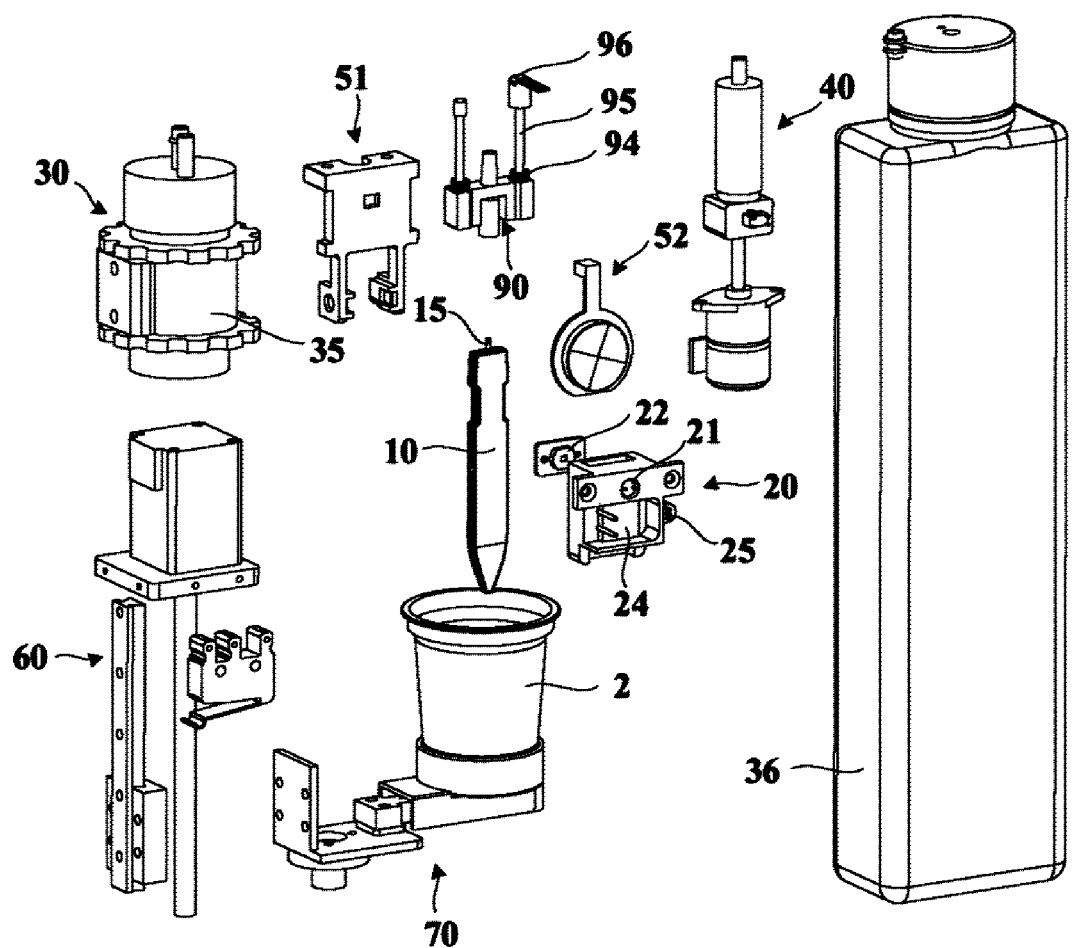
FIG. 4 is a schematic exploded structural diagram of an internal structure of a microfluidic detection system according to one embodiment of the present invention.

FIG. 1 is a schematic structural diagram of the microfluidic detection system for a refrigerator according to one embodiment of the present invention, FIG. 2 is a schematic exploded structural diagram of the microfluidic detection system for a refrigerator according to one embodiment of the present invention, FIG. 3 is a schematic structural diagram of an internal structure of the microfluidic detection system according to one embodiment of the present invention, and FIG. 4 is a schematic exploded structural diagram of the internal structure of the microfluidic detection system according to one embodiment of the present invention. For ease of understanding, a sample cup 2 is also shown in FIGS. 1 to 4.

Referring to FIGS. 1 to 4, the microfluidic detection system 1 according to the present invention includes a microfluidic biochip 10, a sample liquid driving device 40 and a detection mechanism 20. It may be appreciated by those skilled in the art that specific selection of the microfluidic biochip 10 and the detection mechanism 20 used in the microfluidic detection system may vary when the preset detection parameters detected by the microfluidic detection system vary. For example, when the microfluidic detection system is used for pesticide residue detection, the microfluidic biochip 10 thereof can be a microfluidic pesticide residue detection chip capable of providing detection conditions for pesticide residue liquid, and the detection mechanism 20 thereof can be a pesticide residue detection mechanism capable of detecting pesticide residue parameters of the pesticide residue liquid.

Figure 5:
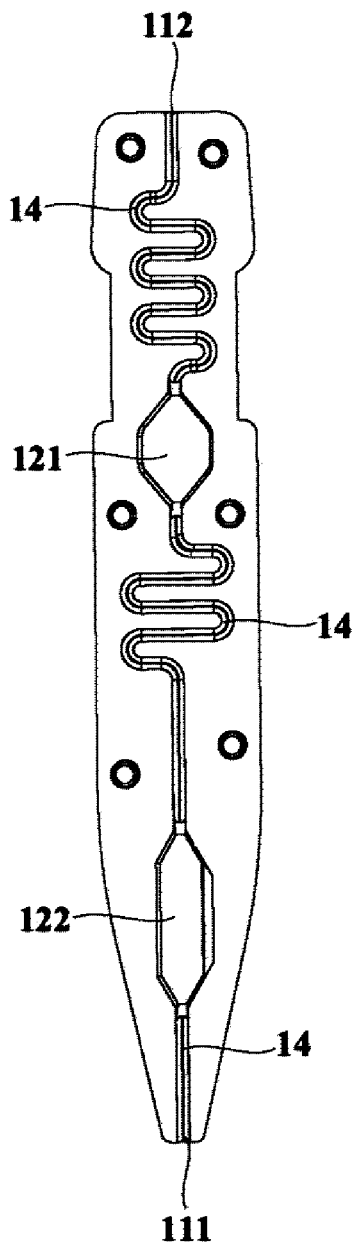
FIG. 5 is a schematic structural diagram of a microfluidic biochip in one embodiment of the present invention.

FIG. 5 is a schematic structural diagram of the microfluidic biochip in one embodiment of the present invention; referring to FIG. 5, the microfluidic biochip 10 has a sample inlet 111, a communication port 112 and a detection pool 121 formed therein, and the sample inlet 111, the detection pool 121 and the communication port 112 communicate in sequence by means of a microfluidic channel 14 to form a main channel. The microfluidic channel 14 in the present invention means a micro flow channel or a capillary flow channel having a flow area within a preset size range, so as to have a suitable capability of holding liquid therein. The sample inlet 111 and the communication port 112 may be formed at an end portion of the microfluidic biochip 10. Further, the sample inlet 111 and the communication port 112 are preferably formed at different end portions of the microfluidic biochip 10.

The sample liquid driving device 40 is in sealed communication with the communication port 112 by means of a sealed docking mechanism 90, and used to impel sample liquid in contact with the sample inlet 111 to enter the microfluidic channel and flow to the detection pool 121 by means of the microfluidic channel. Specifically, the sample liquid driving device 40 may form a negative pressure in the main channel by pumping air outwards, such that the sample liquid in contact with the sample inlet 111 is allowed to flow into the microfluidic channel 14 under the action of the negative pressure.

The detection mechanism 20 is used for detecting the detection pool 121, so as to obtain the preset detection parameter of the sample liquid. Specifically, the detection pool 121 may be provided therein with a detection reagent in advance, or the detection reagent may be manually or automatically added to the detection pool 121, such that the detection mechanism 20 detects the detection pool 121 after the sample liquid in the detection pool 121 reacts with the detection reagent therein.

In a specific embodiment, when the detection mechanism 20 is a pesticide residue detection mechanism for detecting the pesticide residue parameters of the pesticide residue liquid, an enzyme inhibition rate method can be used to rapidly and qualitatively detect whether pesticide residues in the sample liquid exceed the standard. At this point, the microfluidic biochip 10 further includes a reaction pool 122 formed therein, and the reaction pool 122 is located on the main channel formed by sequentially communicating the sample inlet 111, the detection pool 121, and the communication port 112, and is communicated between the sample inlet 111 and the detection pool 121, such that the sample liquid firstly reacts with a reaction reagent in the reaction pool 122 and then flows into the detection pool 121. The reaction pool 122 is communicated with the sample inlet 111 through the microfluidic channel 14, and the reaction pool 122 is communicated with the detection pool 121 through the microfluidic channel 14. The reaction reagent and the detection reagent for pesticide residue detection may be an enzyme reagent and a color developing agent respectively. The reaction pool 122 is configured to allow the sample liquid to react with the enzyme reagent therein, and the sample liquid after the reaction with the enzyme reagent flows into the detection pool 121 to react with the color developing agent in the detection pool 121. The detection mechanism 20 may be selected as a photoelectric detection mechanism and may include a light source 21 and a photosensitive element 22 arranged on two opposite sides of the microfluidic biochip 10 respectively and directly facing the detection pool 121, light emitted from the light source 21 is irradiated to the detection pool 121, and light transmitted through the detection pool 121 is introduced into the photosensitive element 22, which facilitates judgment of the change in an absorbance in the detection pool 121 using a light intensity signal received by the photosensitive element 22, and then facilitates calculation of a pesticide residue inhibition rate. Further, the detection mechanism 20 further includes a heating sheet 24 for supplying heat to the detection pool 121 and a temperature controller 25 for controlling the heating power of the heating sheet 24 to be constant, such that the sample liquid and the detection reagent in the detection pool 121 can react sufficiently and rapidly.

Figure 6:
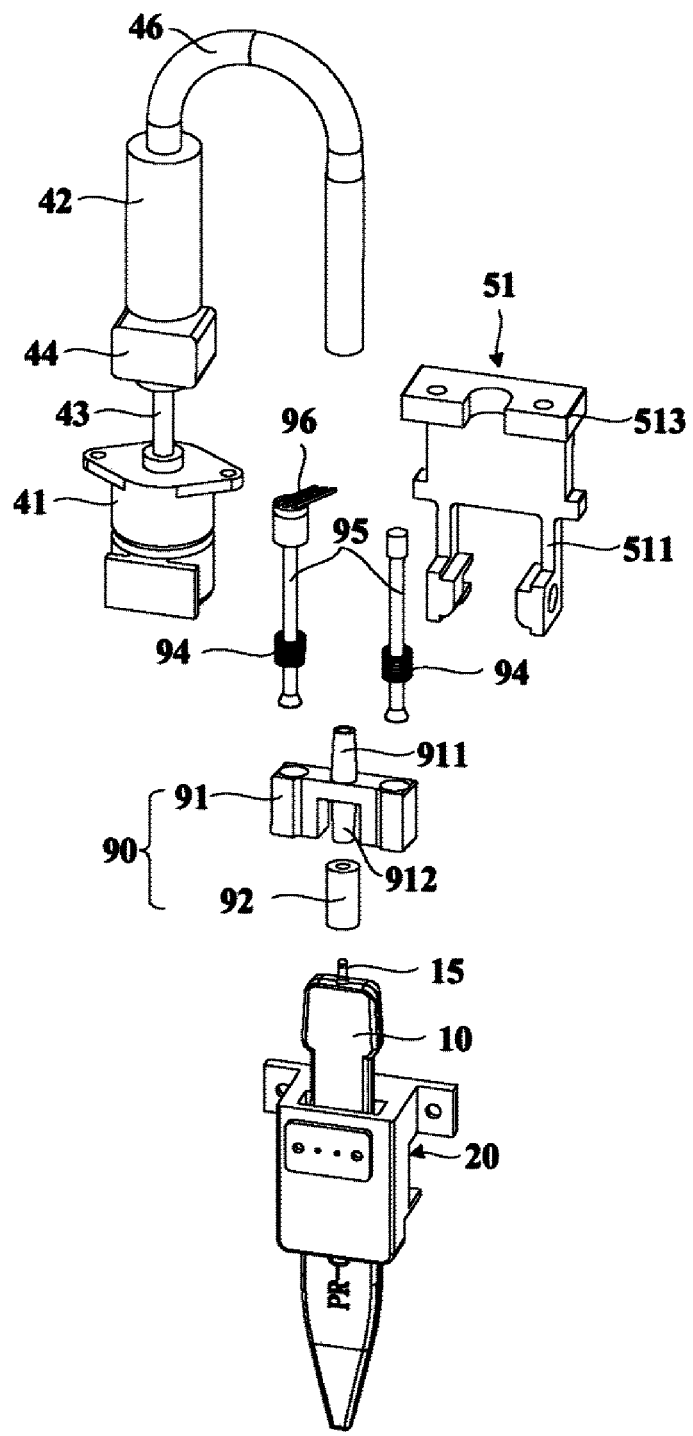
FIG. 6 is a schematic exploded structural diagram of a sample liquid driving device, a microfluidic biochip and related structures in one embodiment of the present invention.
Figure 7:
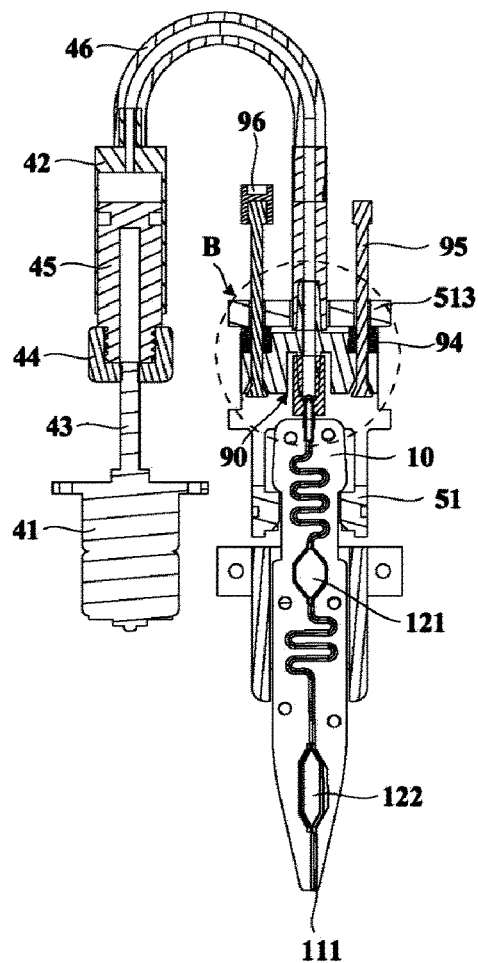
FIG. 7 is a schematic sectional structural diagram of a sample liquid driving device, a microfluidic biochip and related structures in one embodiment of the present invention.
Figure 8:
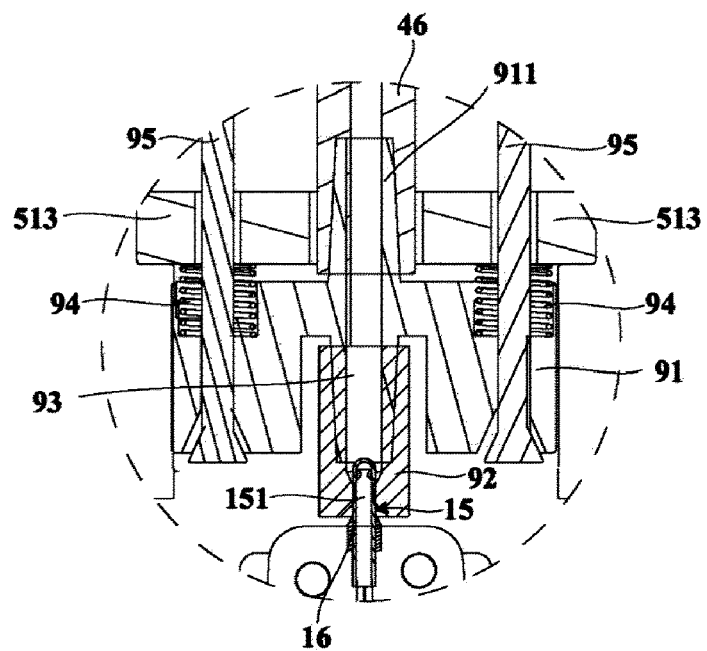
FIG. 8 is a schematic enlarged diagram of part B in FIG. 7.
Figure 9:
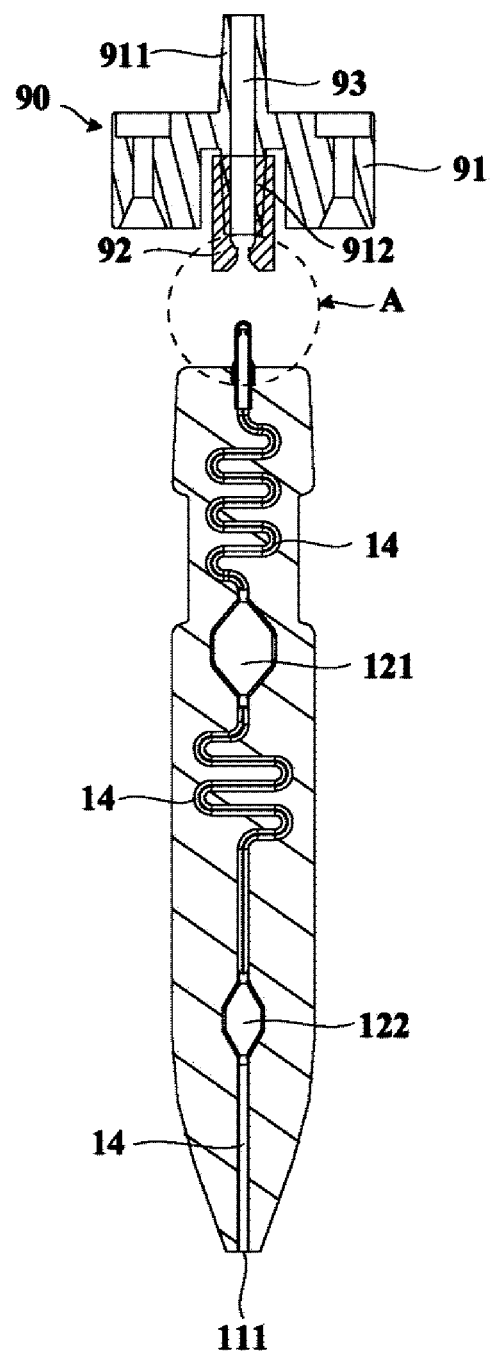
FIG. 9 is a schematic exploded sectional diagram of a microfluidic biochip and a sealed docking mechanism in one embodiment of the present invention.
Figure 10:
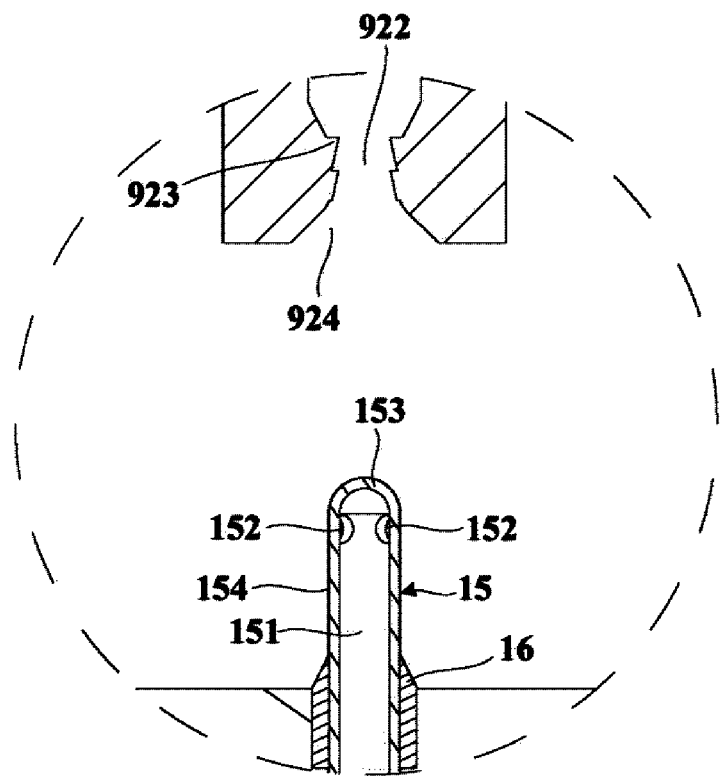
FIG. 10 is a schematic enlarged diagram of part A in FIG. 9.

FIG. 6 is a schematic exploded structural diagram of the sample liquid driving device, the microfluidic biochip and related structures in one embodiment of the present invention, FIG. 7 is a schematic sectional structural diagram of the sample liquid driving device, the microfluidic biochip and related structures in one embodiment of the present invention, FIG. 8 is a schematic enlarged diagram of part B in FIG. 7, FIG. 9 is a schematic exploded sectional diagram of the microfluidic biochip and the sealed docking mechanism in one embodiment of the present invention, and FIG. 10 is a schematic enlarged diagram of part A in FIG. 9. Particularly, the communication port 112 of the microfluidic biochip 10 is fixedly provided with a plug pin 15 protruding and extending outward, an internal flow channel 151 of the plug pin 15 is in sealed communication with the communication port 112, and the plug pin 15 is inserted into the inside of the sealed docking mechanism 90 and forms a fluid-tight connection with the sealed docking mechanism 90, and the sealed docking mechanism 90 is in fluid-tight connection with the sample liquid driving device 40, so that the sample liquid driving device 40 is in sealed communication with the communication port 112.

The applicant recognizes that, since the microfluidic biochip 10 is generally disposable, the microfluidic biochip 10 is required to be replaced frequently, and if the microfluidic biochip 10 is directly in fluid-tight connection with the sample liquid driving device 40, certain damage may be caused to the structure of the sample liquid driving device 40 (for example, a connecting pipeline 46 thereof for being connected with the microfluidic biochip 10 having low structural strength and poor abrasion resistance) after a long time, thereby affecting the service life thereof. For this reason, in the present application, the sealed docking mechanism 90 is particularly designed between the microfluidic biochip 10 and the sample liquid driving device 40. The sealed docking mechanism 90 and the sample liquid driving device 40 form the fluid-tight connection, and particularly, the plug pin 15 protruding and extending outward is fixedly connected to the communication port 112 of the microfluidic biochip 10 in the present invention, the internal flow channel 151 of the plug pin 15 is in sealed communication with the communication port 112, and the plug pin 15 is inserted into the inside of the sealed docking mechanism 90 and forms the fluid-tight connection with the sealed docking mechanism 90. That is, the sealed docking mechanism 90 is simultaneously in fluid-tight connection with the sample liquid driving device 40 and the plug pin 15, thus realizing a sealed communication relationship between the sample liquid driving device 40 and the communication port 112 of the microfluidic biochip 10, avoiding that the problems of air leakage, liquid leakage, or the like, are generated to influence the pressure in the main channel formed by sequential communication of the sample inlet 111, the detection pool 121 and the communication port 112, so as to influence entrance of the sample liquid into the main channel, guaranteeing a better sample introduction effect of the microfluidic detection system 1, and facilitating accurate control over a sample introduction process using the sample liquid driving device 40.

Specifically, the plug pin 15 may be provided with a pin hole 152 for fluidly connecting the internal flow channel 151 thereof with the inside of the sealed docking mechanism 90, and the pin hole 152 is formed in a section of the plug pin 15 located inside the sealed docking mechanism 90; that is, the pin hole of the plug pin 15 is located inside the sealed docking mechanism 90, so as to guarantee a smooth and good fluid communication relationship therebetween, improve the sealing performance therebetween to a great extent, and avoid the problems of air leakage, liquid leakage, or the like, at the connection therebetween.

In some embodiments, the sealed docking mechanism 90 is provided with a sealing ring for abutting contact or pressing contact with the plug pin 15, and a through hole 922 for the plug pin 15 to pass through is formed in the middle of the sealing ring. The outer diameter of the plug pin 15 may be uniform, the plug pin 15 has the outer diameter slightly less than the diameter of the through hole 922 to be in pressing contact with the sealing ring, or the plug pin 15 has the outer diameter equal to the diameter of the through hole 922 to be in abutting contact with the sealing ring, thereby realizing good sealing between the sealed docking mechanism 90 and the plug pin 15.

Further, a sealing reinforcing rib 923 protruding towards the radial inner side of the through hole 922 may be formed on the circumferential wall of the through hole 922, so as to improve the sealing performance between the sealing ring and the plug pin 15. Specifically, the cross section of the sealing reinforcing rib 923 may have an arc-shaped convex shape, a saw-tooth shape, or another suitable shape.

Figure 11:
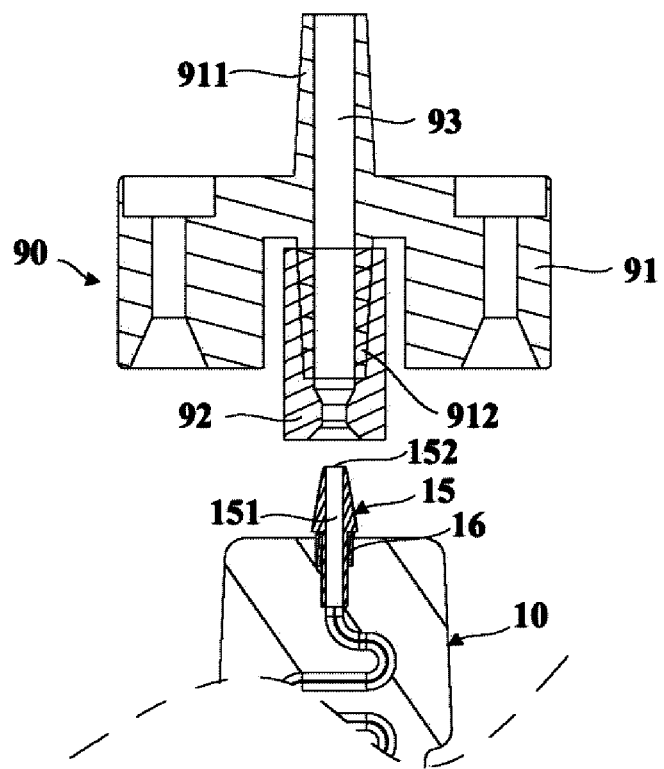
FIG. 11 is a schematic exploded sectional diagram of a microfluidic biochip and a sealed docking mechanism in another embodiment of the present invention.

FIG. 11 is a schematic exploded sectional diagram of the microfluidic biochip and the sealed docking mechanism in another embodiment of the present invention. In some other embodiments, the outer diameter of the plug pin 15 may alternatively be uneven, and the outer circumferential wall of an end section of the plug pin 15 for insertion into the sealed docking mechanism 90 is tapered in an insertion direction of the plug pin 15 (i.e., the direction of outward extension of the plug pin 15 from the microfluidic biochip 10), so as to form a reliable sealed connection relationship between the plug pin 15 and the sealed docking mechanism 90 (specifically, the sealing ring of the sealed docking mechanism 90) by using the shape of the outer circumferential wall of the plug pin 15. In these embodiments, in order to reduce friction between the outer circumferential wall of the plug pin 15 and the sealed docking mechanism 90, the pin hole 152 of the plug pin 15 for fluid communication with the sealed docking mechanism 90 may be formed at an end surface of an extended tip of the plug pin 15.

In order to avoid damage to the sealed docking mechanism 90 after frequent insertion and removal of the plug pin 15, the structural strength of the sealed docking mechanism 90 may be increased, which, however, has a higher requirement for a material of the sealed docking mechanism 90, and even if a material having higher mechanical strength is adopted, the sealed docking mechanism 90 may still be structurally damaged after the plug pin 15 is inserted and removed a limited number of times. For this reason, the applicant of the present application improves the structure of the plug pin 15 from another perspective. Referring to FIG. 7, the end surface 153 of the extended tip of the plug pin 15 is a continuous and smooth hemispherical surface, and the pin hole 152 of the plug pin 15 for fluid communication with the sealed docking mechanism 90 is formed on the circumferential side 154 of a section of the plug pin 15 located inside the sealed docking mechanism 90. Thus, when the microfluidic biochip 10 provided with the plug pin 15 is hermetically docked with the sealed docking mechanism 90, the contact surface between the plug pin 15 and the sealed docking mechanism 90 is a smooth spherical surface, such that friction between the plug pin 15 and the sealed docking mechanism 90 is reduced, the sealed docking mechanism 90 cannot be scratched or punctured, the sealed docking mechanism 90 is guaranteed to keep a good sealed docking function for a long time, the service life of the microfluidic detection system 1 is prolonged, and meanwhile, the requirement for the structural strength of the sealed docking mechanism 90 is reduced.

It should be noted that the extended tip of the plug pin 15 means an end of the plug pin 15 extending into the sealed docking mechanism 90. Further, the pin hole 152 may be formed at the circumferential side 154 of a section of the plug pin 15 close to the extended tip thereof, and thus, the fluid communication relationship between the plug pin 15 and the sealed docking mechanism 90 may be guaranteed even if the section of the plug pin 15 inserted into the sealed docking mechanism 90 is not long.

In some embodiments, the plug pin 15 is inserted into the microfluidic biochip 10 through the communication port 112, and a starting end of the plug pin 15 extending into the microfluidic biochip 10 is open to be communicated with the microfluidic channel 14, so as to be communicated with the communication port 112. The matching interface between the plug pin 15 and the communication port 112 can be sealed by sealing gum 16 to enhance the sealing performance between the plug pin 15 and the microfluidic biochip 10.

In some alternative embodiments, the plug pin 15 and the microfluidic biochip 10 may also be integrally formed.

Further, the part of the sealing gum 16 exposed outside the communication port 112 may be tapered along the insertion direction of the microfluidic biochip 10 (i.e., the direction of outward extension of the plug pin 15 from the microfluidic biochip 10). A concave hole 924 with a shape matched with the shape of the tapered part of the sealing gum 17 is formed on the sealed docking mechanism 90, such that after the plug pin 15 is inserted into the sealed docking mechanism 90, the concave hole 924 and the sealing gum 16 form auxiliary sealing, thus further improving the sealing performance between the sealed docking mechanism 90 and the plug pin 15.

In some embodiments, the sealed docking mechanism 90 is connected between the microfluidic biochip 10 and the sample liquid driving device 40, a through channel 93 penetrating through the sealed docking mechanism 90 is formed in the sealed docking mechanism 90, and the sample liquid driving device 40 and the communication port 112 are both communicated with the through channel 93.

Specifically, the sample liquid driving device 40 may have a connecting pipeline 46 connected with the sealed docking mechanism 90. The communication port 112 may be formed on the top of the microfluidic biochip 10, and the sample liquid driving device 40 may be adjacently provided on the transverse side of the microfluidic biochip 10, so as to prevent the sample liquid driving device 40 from being adversely affected by liquid leakage which may be generated by the microfluidic biochip 10. The connecting pipeline 46 may be communicated with the top of the sample liquid driving device 40 to be bridged between the sample liquid driving device 40 and the microfluidic biochip 10.

Further, the sealed docking mechanism 90 includes a first connecting piece 91 and a second connecting piece 92 sequentially arranged between the sample liquid driving device 40 and the microfluidic biochip 10, a first connecting column 911 and a second connecting column 912 protruding and extending in opposite directions are formed on two opposite sides of the first connecting piece 91 respectively, and the first connecting column 911 is inserted into the connecting pipeline 46, so as to realize the fluid-tight connection between the sample liquid driving device 40 and the sealed docking mechanism 90; the second connecting column 912 is inserted into the second connecting piece 92, and the plug pin 15 is in insertion-connection with the second connecting piece 92, so as to realize the fluid-tight connection between the plug pin 15 and the sealed docking mechanism 90. The first connecting column 911 and the connecting pipeline 46 may be in insertion-connection by means of abutting contact or pressing contact, and the second connecting column 912 and the second connecting piece 92 may be in insertion-connection by means of abutting contact or pressing contact, so as to improve the sealing performance. The sealing ring may be formed on the second connecting piece 92. When the microfluidic biochip 10 is mounted upwards in the vertical direction, the first connecting column 911 extends upwards vertically, the second connecting column 912 extends downwards vertically, the second connecting piece 92 is located below the first connecting piece 91, and the sealing ring is formed at the bottom of the second connecting piece 92.

In some embodiments, the microfluidic detection system 1 further includes a chip mounting mechanism 51 for fixing the microfluidic biochip 10 after the plug pin 15 and the sealed docking mechanism 90 form the fluid-tight connection, such that the microfluidic biochip 10 keeps a state of fluid-tight connection with the sample liquid driving device 40. It should be noted that "fixed" herein means that the microfluidic biochip 10 is immovable rather than undetachable after mounted on the chip mounting mechanism 51. Preferably, to facilitate replacement of the microfluidic biochip 10, the microfluidic biochip 10 is detachably mounted on the chip mounting mechanism 51.

Further, the microfluidic detection system 1 further includes an elastic pressing mechanism 94 for applying an elastic acting force to the sealed docking mechanism 90, such that the sealed docking mechanism 90 is elastically and hermetically docked with the sample liquid driving device 40 and the microfluidic biochip 10 at the same time. Specifically, the elastic acting force towards the microfluidic biochip 10 can be applied to the sealed docking mechanism 90 by the elastic pressing mechanism 94, and the force of reaction of the microfluidic biochip 10 to the sealed docking mechanism 90 is used for promoting the sealed docking mechanism 90 to be elastically and hermetically docked with the sample liquid driving device 40, such that the sealed docking mechanism 90 is always kept in a state of being tightly and hermetically docked with the sample liquid driving device 40 and the microfluidic biochip 10 at the same time, and the problems of looseness, breakage, or the like, caused by long-time use of other docking mechanisms are avoided, thereby guaranteeing a long-term and reliable fluid-tight communication relationship between the sample liquid driving device 40 and the communication port 112 of the microfluidic biochip 10, and improving the sealing effect therebetween.

In some embodiments, the elastic pressing mechanism 94 may be a spring, one end of the spring abuts against a fixedly arranged end plate 513, the other end of the spring abuts against the sealed docking mechanism 90, and the end plate 513 and the microfluidic biochip 10 are located on two opposite sides of the sealed docking mechanism 90 respectively, such that the spring generates the elastic acting force towards the microfluidic biochip 10 on the sealed docking mechanism 90. Specifically, in a mounted state of the microfluidic biochip 10, the spring is in a compressed state to generate the elastic acting force for urging the sealed docking mechanism 90 to have a tendency to move towards the microfluidic biochip 10. The number of the elastic pressing mechanisms 94 may be two or more, so as to increase the elastic acting force acting on the microfluidic biochip 10, and to make the elastic acting force applied to the microfluidic biochip 10 more balanced, thereby avoiding inclination and further improving the sealed connection effect. Specifically, the end plate 513 may be formed on the chip mounting mechanism 51, the chip mounting mechanism 51 is fixed on a bracket 87, the bracket 87 is fixed on a support plate 86, and the support plate 86 is fixedly provided in a housing 80.

In some embodiments, the microfluidic detection system 1 further includes a guide rod 95 sleeved with the spring to prevent the spring from being displaced. One end of the guide rod 95 is fixedly connected with the sealed docking mechanism 90, and the other end of the guide rod is in contact with a Hall switch 96 after the plug pin 15 and the sealed docking mechanism 90 form the fluid-tight connection, such that the Hall switch 96 is prompted to generate a trigger signal for indicating that the microfluidic biochip 10 is mounted in place, so as to prompt a user, thus avoiding structural damage caused by excessive mounting of the microfluidic biochip 10, and meanwhile improving the use experience of the user.

Specifically, the guide rod 95 may pass through the end plate 513 and be limited and supported by the end plate 513. When the microfluidic biochip 10 is mounted upwards in the vertical direction, the head of the guide rod 95 above the end plate 513 may be provided with an expanded portion, and when the microfluidic biochip 10 is not mounted, the spring is in a natural state, and the guide rod 95 and the sealed docking mechanism 90 move downwards under the action of the gravity thereof until the expanded portion of the guide rod 95 abuts against the end plate 513, thereby supporting the guide rod 95 and the sealed docking mechanism 90 to prevent further downward movement thereof.

In some embodiments, the chip mounting mechanism 51 includes two oppositely arranged elastic clamping jaws 511, so as to apply opposite acting forces to the microfluidic biochip 10 clamped between the two elastic clamping jaws 511.

Further, the microfluidic detection system 1 further includes a cantilever button 52 suspended on one side of the microfluidic biochip 10, and the cantilever button 52 abuts against the oppositely arranged inner sides of the two elastic clamping jaws 511 at the same time, so as to apply outward acting forces to the inner sides of the two elastic clamping jaws 511 when the cantilever button 52 is subjected to an acting force towards the microfluidic biochip 10, such that the two elastic clamping jaws 511 elastically deform towards outer side directions departing from each other. That is, when the microfluidic biochip 10 is required to be disassembled, a user only needs to press the cantilever button to release the clamping effect of the two elastic clamping jaws 511 on the microfluidic biochip 10, so as to release the microfluidic biochip 10, and the operation is quite simple and convenient; the cantilever button 52 has a quite simple structure and a quite ingenious design.

After the clamping effect of the two elastic clamping jaws 511 on the microfluidic biochip 10 is released, under the action of an elastic deformation restoring force of the elastic pressing mechanism 94, an acting force in a direction opposite to the mounting direction of the microfluidic biochip 10 is applied to the sealed docking mechanism 90, the sealed docking mechanism 90 drives the microfluidic biochip 10 to move in the direction opposite to the mounting direction of the microfluidic biochip 10, and the microfluidic biochip 10 can be ejected by a predetermined distance under the action of inertia, such that the user can take out the microfluidic biochip conveniently.

In some embodiments, the sample liquid driving device 40 may be a micro injection pump, and may form the negative pressure in the main channel by pumping air outwards, such that the sample liquid in contact with the sample inlet 111 enters the main channel under the action of the negative pressure. Specifically, the sample liquid driving device 40 includes a driving motor 41, a vertically extending injector 42, a lead screw 43, a slider 44, and a piston 45.

The injector 42 is fixed on the bracket 87, and the top of the injector 42 is in sealed communication with the communication port 112 on the top of the microfluidic biochip 10 through the connecting pipeline 46. The lead screw 43 extends vertically and is connected with the driving motor 41 to be rotated under the driving of the driving motor 41. The lead screw 43 penetrates through the slider 44, and the slider is in threaded connection with the lead screw 43 to move up and down along the lead screw 43 with the rotation of the lead screw 43. Specifically, the bracket 87 may be provided with a vertically extending guide groove, and the slider 44 is located in the guide groove; thus, the movement of the slider 44 in the up-down direction is guided through the guide groove. The piston 45 is provided inside the injector 42 and fixedly connected with the slider 44, so as to be driven by the slider 44 to move in the up-down direction, such that the negative pressure is generated in the main channel when the piston moves downwards, and then, the sample liquid in contact with the sample inlet 111 is impelled to flow into the microfluidic channel and flows into the detection pool 121 through the microfluidic channel, and the sample liquid in the main channel is impelled to flow to the sample inlet 111 when the piston moves upwards.

In some embodiments, the microfluidic detection system 1 further includes a sample stage 70, the sample stage 70 is used for placing the sample cup 2, and the sample cup 2 is used for containing the sample liquid. The sample stage 70 is configured to be controllably or operatively moved to transport the sample cup 2 placed thereon by the sample stage 70 to a position allowing the sample liquid in the sample cup 2 to be in contact with the sample inlet 111 of the microfluidic biochip 10. Thus, sample loading of the microfluidic biochip 10 is realized. The user is only required to place the sample cup 2 on the sample stage 70, or after placing the sample cup 2 on the sample stage 70, the user moves the sample stage 70 to a position where the sample liquid is in contact with the sample inlet 111 of the microfluidic biochip 10, such that the sample loading operation is quite convenient, and time and labor are saved. In addition, in the present application, the sample stage 70 is configured to be movable, thus omitting complex structures, such as a sample liquid delivery pump, a delivery pipeline, a sampling needle, or the like, such that the microfluidic detection system 1 has a quite simple structure, and thus is suitable for being integrated on a refrigerator to facilitate family use. Specifically, the sample stage 70 is preferably provided below the microfluidic biochip 10, and the sample inlet 111 is preferably provided at the lower end of the microfluidic biochip 10, such that the sample inlet 111 is conveniently in contact with the sample liquid in the sample cup 2 placed on the sample stage 70.

Further, the microfluidic detection system 1 further includes a lifting mechanism 60 for driving the sample stage 70 to move up and down, such that the sample stage 70 is switched between a detection position allowing the sample liquid in the sample cup 2 placed on the sample stage 70 to be in contact with the sample inlet 111 and an initial position at a preset distance below the detection position. That is, the sample stage 70 may be automatically lifted and lowered by the lifting mechanism 60.

Figure 12:
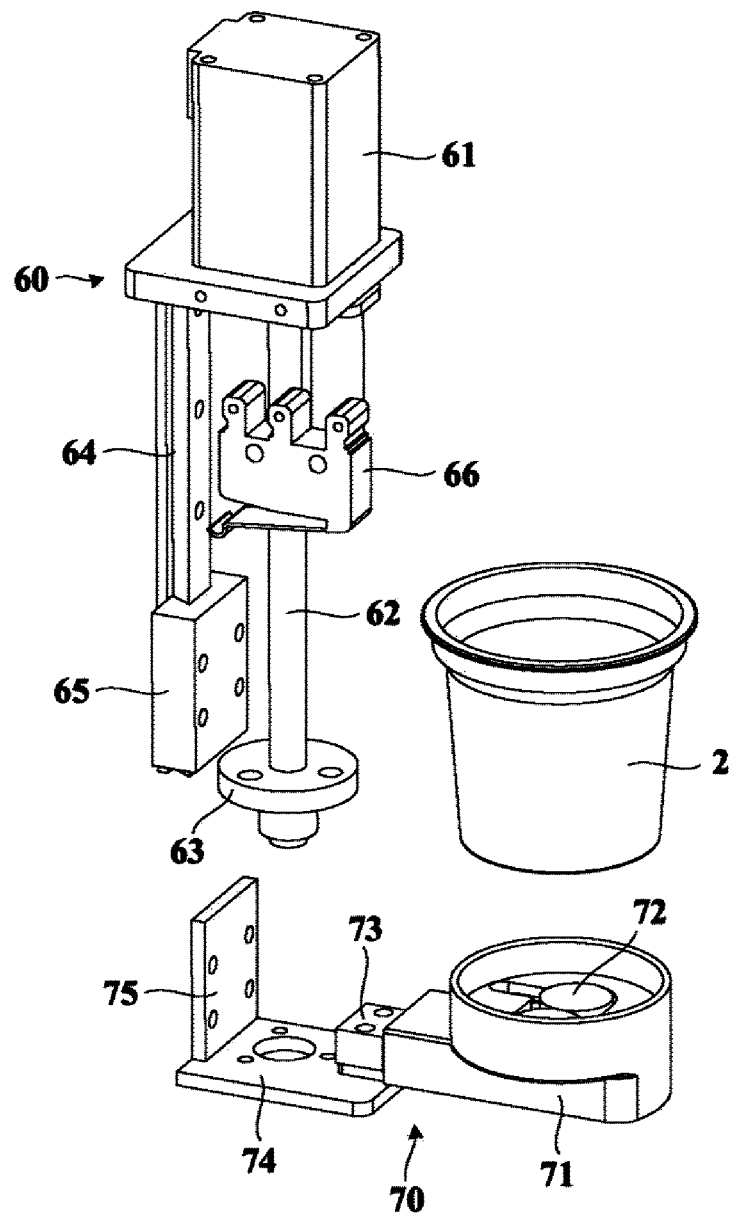
FIG. 12 is a schematic structural diagram of a lifting mechanism and a sample stage in a disassembled state in one embodiment of the present invention.

FIG. 12 is a schematic structural diagram of the lifting mechanism and the sample stage in a disassembled state in one embodiment of the present invention. In some embodiments, the lifting mechanism 60 may include a lifting motor 61, a transmission lead screw 62, and a nut 63. The lifting motor 61 is used to output a driving force. The transmission lead screw 62 is vertically provided and connected with an output shaft of the lifting motor 61 to be rotated under the driving of the lifting motor 61. The transmission lead screw 62 penetrates through the nut 63, and the nut is in threaded connection with the transmission lead screw 62 to move up and down along the transmission lead screw 62 with the rotation of the transmission lead screw 62. The sample stage 70 is fixedly connected with the nut 63, such that the nut 63 drives the sample stage 70 to move up and down.

Further, the lifting mechanism 60 further includes a slide rail 64 and a slider 65. The slide rail 64 is provided beside the transmission lead screw 62 in parallel with the transmission lead screw 62, the slider 65 is movably provided on the slide rail 64, and the sample stage 70 is fixedly connected with the slider 65, so that the sample stage 70 is guided to move up and down through the cooperation of the slide rail 64 and the slider 65. Specifically, the slider 65 is driven to move synchronously when the sample stage 70 moves in the up-down direction under the action of a driving module, the slider 65 is limited on the slide rail 64, and the slide rail 64 has guiding and limiting effects on the movement of the slider 65, such that the sample stage 70 is indirectly guided and limited, the sample stage 70 is prevented from being shifted or jammed in a moving process, and the movement stability of the sample stage 70 is improved. Specifically, the sample stage 70 may include a horizontal connecting plate 74 through which the transmission lead screw 62 penetrates and which is fixedly connected with the nut 63, and a vertical connecting plate 75 extending upwards perpendicular to the horizontal connecting plate 74, the vertical connecting plate 75 being fixedly connected with the slider 65.

In some embodiments, the lifting mechanism 60 further includes a limit switch 66, and the limit switch 66 is provided close to an upper portion of the transmission lead screw 62 to cause the lifting motor 61 to stop operation when the sample stage 70 moves upwards to touch the limit switch 66. The position of the limit switch 66 is set such that the sample stage 70 is located at the detection position thereof when the lifting motor 61 stops operation under the trigger of the limit switch 66. The sample stage 70 may be kept at the detection position thereof when the lifting motor 61 does not operate. In the present application, the detection position of the sample stage 70 is positioned by the limit switch 66, the positioning is accurate, and the problem that the sample stage 70 exceeds the detection position thereof and continues to move to cause structural damage to the sample stage 70, the microfluidic biochip 10, or the like, can be avoided.

In some embodiments, the sample stage 70 may include a support stage 71 and an oscillator 72. The support stage 71 is used for supporting the sample cup 2. Specifically, the support stage 71 may be a horizontally placed support plate, and a groove for placing the bottom of the sample cup 2 therein may be provided on the support plate, so as to prevent the sample cup 2 from toppling or shaking during the moving process of the sample stage 70, thereby improving the stability of the placement of the sample cup 2. The support stage 71 is fixedly connected with the horizontal connecting plate 74.

The oscillator 72 is provided on the support stage 71, and is used to oscillate the sample cup 2 after the sample cup 2 is placed on the support stage 71, such that buffer liquid and a sample in the sample cup 2 are fully mixed to generate the sample liquid, thereby fully dissolving a to-be-detected substance on the sample into the buffer liquid to obtain the sample liquid with a suitable concentration. The buffer fluid may be pre-loaded into the sample cup 2 by means of manual addition or may be automatically delivered to the sample cup 2 by a driving device after the sample cup 2 is placed on the sample stage 70.

In some embodiments, the sample stage 70 further includes a weighing sensor 73, and the weighing sensor 73 is provided below the support stage 71 for weighing the weight of the sample in the sample cup 2, thereby allowing a buffer liquid driving device 30 to deliver a preset amount of buffer liquid matched with the weight of the sample to the sample cup 2. In general, the sample is extracted at will by a home user, for example, a small vegetable leaf is torn off at will, and therefore, in order to guarantee the accuracy of a measurement result, the quantity of the buffer liquid input into the sample cup 2 is required to be matched with the quantity of the sample, so as to generate the sample liquid with a proper concentration. In the present application, the weight of the sample can be automatically and accurately obtained by the weighing sensor 73 provided below the support stage 71, such that the buffer liquid driving device 30 is automatically controlled to input the matched amount of buffer liquid into the sample cup 2, thus guaranteeing the accuracy of the measurement result, avoiding various problems of inconvenient use, a complex operation, a large error, or the like, caused by manual weighing of the sample by the user, and further improving the automation degree of the microfluidic detection system and the use experience of the user.

It should be noted that, in some alternative embodiments, the sample stage 70 may be fixed, and the microfluidic pesticide residue detection chip 10 may be configured to be movable, which can also facilitate the sampling operation.

In some embodiments, the microfluidic detection system 1 further includes the housing 80. The housing 80 is provided with an operation stage 83 opened towards the front side thereof, and the sample stage 70 is at least partially located in the operation stage 83 to facilitate the user to perform operations of placing the sample cup 2, taking out the sample cup 2, or the like, in the operation stage 83. A water disposal pan 88 located at a lower portion of the operation stage 83 may be provided in the operation stage 83 to receive possibly dripping liquid, thereby preventing contamination of the operation stage 83. At least some sections of the microfluidic biochip 10, the detection mechanism 20, a buffer liquid bottle 36, and the buffer liquid driving device 30 are arranged in the housing 80. Further, the housing 80 is provided with a first structural connecting piece 81 for being connected with a cabinet or a door of the refrigerator, and a first electrical connecting piece 82 for forming an electrical connection between the microfluidic detection system 1 and an electrical control device of the refrigerator 100, so as to allow the microfluidic detection system 1 to be mounted to the cabinet or door of the refrigerator as a whole.

In some embodiments, the microfluidic detection system 1 further includes the buffer liquid bottle 36 and the buffer liquid driving device 30. The buffer liquid bottle 36 is provided in the housing 80 and is used for containing the buffer liquid. The buffer liquid driving device 30 is provided in the housing 80 and is communicated with the buffer liquid bottle 36 to controllably drive the buffer liquid in the buffer liquid bottle 36 into the sample cup 2 placed on the sample stage 70, such that the buffer liquid is mixed with the sample in the sample cup 2 to generate the sample liquid. Specifically, the buffer liquid bottle 36 is communicated with the buffer liquid driving device 30 through an inlet pipe 32. An outlet pipe 31 of the buffer liquid driving device 30 extends to the sample stage 70. This arrangement is adopted mainly for a solid sample as the detected sample, and the buffer liquid is required to dissolve the to-be-detected substance on the solid sample to form the sample liquid; or, the sample is a liquid sample, but has a too high concentration, and the sample is required to be diluted using to the buffer liquid to produce the sample liquid. For example, during pesticide residue detection, the detected sample is usually a solid food residue piece, such as a skin, a leaf, or the like, the sample is required to be placed in the buffer liquid, and the pesticide residue on the sample is dissolved in the buffer liquid to form the sample liquid.

Specifically, the buffer liquid driving device 30 may be a peristaltic pump, a diaphragm pump or other suitable types of driving devices. The peristaltic or diaphragm pump generates large vibrations in the radial direction thereof when in operation, and in order to prevent the vibrations from being transmitted to the microfluidic biochip 10, an elastic damping piece 35 may be provided on the radial outer side of the peristaltic or diaphragm pump. The elastic damping piece 35 may be fitted over the buffer liquid driving device 30 and supported in the housing 80 by the clamping effect of the bracket 87 and a fixed block 89, and the fixed block 89 may be fixed on the support plate 86.

In some embodiments, the microfluidic detection system 1 further includes a circuit board 53, a display device 56, and a switch button 57, the circuit board 53 being provided within the housing 80 and electrically connected with the first electrical connecting piece 82 on the housing 80. The electrical components of the microfluidic detection system 1 (for example, the lifting mechanism 60, the buffer liquid driving device 30, the sample liquid driving device 40, the display device 56, the switch button 57, or the like) are all electrically connected to the circuit board 53 directly or indirectly. The display device 56 is provided on the front side of the housing 80 and electrically connected to the circuit board 53 for displaying the detection result of the detection mechanism 20. The switch button 57 is provided on the front side of the housing 80 and electrically connected to the circuit board 53 for activating and/or deactivating the detection function of the microfluidic detection system 1. That is, the user can start, pause, or stop the detection function of the microfluidic detection system 1 by operating the switch button 57.

In some embodiments, the housing 80 may include a rear shell 84 at the rear side and a front panel 85 connected to the front side of the rear shell 84. An accommodating cavity is defined between the rear shell 84 and the front panel 85 after the rear shell and the front panel are assembled. The support plate 86 and the bracket 87 are further provided in the accommodating cavity of the housing 80. The support plate 86 is fixedly connected to the rear shell 84, and at least a part of the structure of the lifting mechanism 60 (for example, the non-movable part of the lifting mechanism) and the buffer liquid driving device 30 are fixed on the support plate 86. The bracket 87 is fixedly connected to the front side of the support plate 86, and the microfluidic biochip 10 and the sample liquid driving device 40 are directly or indirectly supported on the bracket 87. Thus, the lifting mechanism 60, the buffer liquid driving device 30, the microfluidic biochip 10, and the sample liquid driving device 40 can be stably supported by the support plate 86 and the bracket 87 in the accommodating cavity formed between the rear shell 84 and the front panel 85.

In some embodiments, the lifting mechanism 60 may be provided on the transverse side of the sample stage 70, the buffer liquid driving device 30 may be provided on one side of the microfluidic biochip 10 in the transverse direction and located above the lifting mechanism 60, the sample liquid driving device 40 is located on the other side of the microfluidic biochip 10 in the transverse direction, and the buffer liquid bottle 36 is located on a side of the sample liquid driving device 40 away from the microfluidic biochip 10. For the microfluidic biochip 10, the sample stage 70, the lifting mechanism 60, the buffer liquid driving device 30, the sample liquid driving device 40 and the buffer liquid bottle 36 with such a layout, the size features of each module in the vertical direction and the transverse direction are fully utilized, such that the layout of the modules is more compact, and the occupied space is reduced as far as possible. Moreover, the modules are only arranged side by side in the vertical direction and the transverse direction, such that the thickness of the microfluidic detection system 1 in the front and rear direction is reduced as far as possible, and the microfluidic detection system is more suitable for being integrated on the refrigerator.

Further, a partition 861 extending transversely may be provided between the buffer liquid driving device 30 and the lifting mechanism 60 to avoid that leaked liquid possibly generated by the buffer liquid driving device 30 drops on the lifting mechanism 60 to affect the normal operation of the lifting mechanism 60. The partition 861 may be fixed on the support plate 86.

Figure 13:
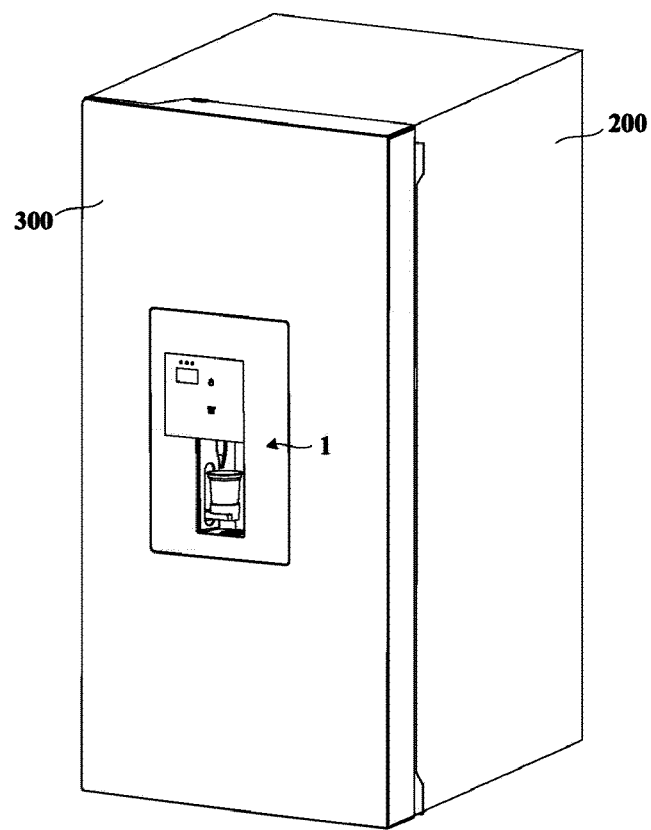
FIG. 13 is a schematic structural diagram of a refrigerator according to one embodiment of the present invention.

The present invention further provides a refrigerator, and FIG. 13 is a schematic structural diagram of the refrigerator according to one embodiment of the present invention. The refrigerator 100 according to the present invention includes the microfluidic detection system 1 according to any one of the above embodiments, so as to integrate the microfluidic detection system 1 on the refrigerator 100. The refrigerator 100 is frequently used in daily life, and mainly configured to store food materials, and when the microfluidic detection system 1 is integrated on the refrigerator 100, a user can conveniently perform a detection operation of a food material sample by using the microfluidic detection system 1.

Further, the refrigerator 100 further includes a cabinet 200 and a door 300, the cabinet 200 defines a storage space therein, and the door 300 is connected to the cabinet 200 and configured to open and/or close the storage space. The microfluidic detection system 1 is preferably provided on the door 300, such that the operation is convenient, an original storage space in the cabinet 200 cannot be occupied, and the storage capacity of the refrigerator 100 cannot be influenced.

Figure 14:
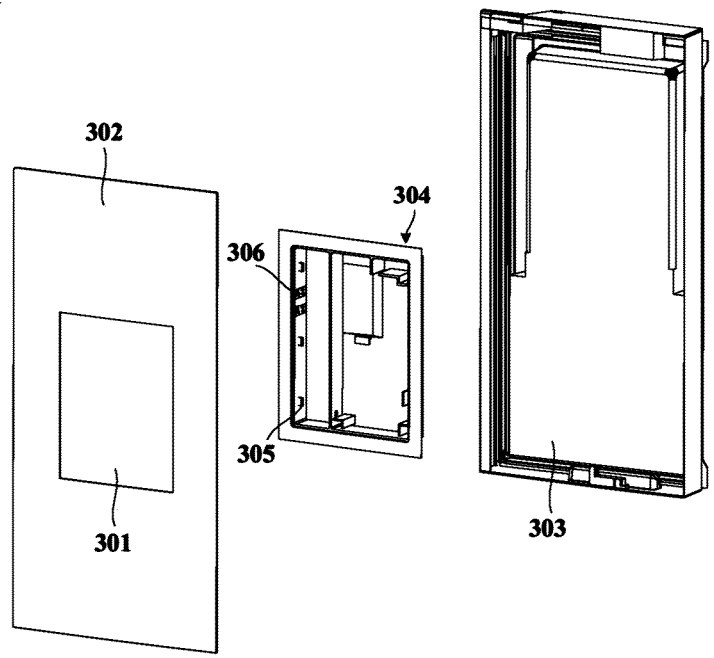
FIG. 14 is a schematic exploded structural diagram of a door in one embodiment of the present invention.

FIG. 14 is a schematic exploded structural diagram of the door in one embodiment of the present invention. In some embodiments, a hollowed window 301 is provided on the front side of the door 300, and the sample stage 70 of the microfluidic detection system 1 is exposed on the front side of the door 300 through the hollowed window 301, such that the user can be allowed to place the sample cup on the sample stage 70 without opening the door 300, thus avoiding the problem that cold leakage is serious due to the door 300 being required to be opened during each time of detection, guaranteeing the heat preservation performance of the refrigerator 100, and saving energy consumption.

Specifically, the door 300 may include a panel 302 for forming a front portion of the door, a door liner 303 for forming a rear portion of the door, and a foamed heat insulation layer (not shown) provided between the panel 302 and the door liner 303, and the hollowed window 301 is formed in the panel 302. A pre-embedded box 304 is pre-embedded between the panel 302 and the door liner 303 before the foamed heat insulation layer is formed, and the microfluidic detection system 1 is provided in the pre-embedded box 304. That is, the pre-embedded box 304 is pre-provided between the panel 302 and the door liner 303 before the door 300 is foamed, so as to reserve a space for mounting the microfluidic detection system 1 between the panel 302 and the door liner 303.

Further, the pre-embedded box 304 is attached to the rear surface of the panel 302, and the front side of the pre-embedded box 304 is open and directly faces the hollowed window 301, such that the microfluidic detection system 1 is allowed to be mounted in the pre-embedded box 304 from front to back through the hollowed window 301, thus improving the mounting convenience of the microfluidic detection system 1.

Specifically, the pre-embedded box 304 can be provided with a second structural connecting piece 305 matched and connected with the first structural connecting piece 81 and a second electrical connecting piece 306 electrically connected with the first electrical connecting piece 82, and the second electrical connecting piece 306 is electrically connected with the electrical control device of the refrigerator 100. Thus, the microfluidic detection system 1 is mounted on the door 300 as a whole by arranging the corresponding structural connecting pieces and electrical connecting pieces on the pre-embedded box 304 and the housing 80, such that the whole microfluidic detection system 1 is connected with the refrigerator 100 in terms of both structure and circuit. Thus, the assembly process of the microfluidic detection system 1 is simplified, and the disassembly or maintenance of the microfluidic detection system 1 is facilitated.

The refrigerator 100 according to the present application is a refrigerator in a broad sense, and includes not only a so-called refrigerator in a narrow sense, but also a storage device having a refrigerating, freezing or other storage function, for example, a refrigerating box, a freezer, or the like.

It should also be understood by those skilled in the art that the terms "up", "down", "front", "rear", "top", "bottom", or the like, used in the embodiments of the present invention are used as terms for indicating the orientation or the positional relationship with respect to the actual use state of the microfluidic detection system 1 and the refrigerator 100, and these terms are only used for convenience of description and understanding of the technical solution of the present invention, and do not indicate or imply that the device or the component referred to must have a specific orientation, or be configured and operated in a specific orientation, and therefore, should not be construed as limiting the present invention.

So far, those skilled in the art should be aware that, although plural exemplary embodiments of the present invention have been shown and described herein in detail, a lot of other variations or modifications conforming to the principle of the present invention can still be directly determined or derived from the contents disclosed in the present invention without departing from the spirit and scope of the present invention. Therefore, the scope of the present invention should be understood and deemed as covering all of these other variations or modifications.

What is claimed is:

1. A microfluidic detection system for a refrigerator, comprising:
    a microfluidic biochip that has a sample inlet, a communication port and a detection pool formed therein, wherein the sample inlet, the detection pool and the communication port communicate in sequence by means of a microfluidic channel;
    a sample liquid driving device, which is in sealed communication with the communication port by means of a sealed docking mechanism, and is used to impel sample liquid in contact with the sample inlet to enter the microfluidic channel and flow to the detection pool by means of the microfluidic channel; and
    a detection mechanism, which is used for detecting the detection pool so as to obtain a preset detection parameter of the sample liquid,
    wherein the communication port of the microfluidic biochip is fixedly provided with a plug pin protruding and extending outward, an internal flow channel of the plug pin is in sealed communication with the communication port, and the plug pin is inserted into the inside of the sealed docking mechanism and forms a fluid-tight connection with the sealed docking mechanism, and the sealed docking mechanism is in fluid-tight connection with the sample liquid driving device, so that the sample liquid driving device is in sealed communication with the communication port;
    wherein the sealed docking mechanism is connected between the microfluidic biochip and the sample liquid driving device, a through channel penetrating through the sealed docking mechanism is formed in the sealed docking mechanism, and the sample liquid driving device and the communication port are both communicated with the through channel; and
    wherein the sample liquid driving device is provided with a connecting pipeline connected with the sealed docking mechanism, the sealed docking mechanism comprises a first connecting piece and a second connecting piece which are sequentially arranged between the sample liquid driving device and the microfluidic biochip, a first connecting column and a second connecting column protruding and extending in opposite directions are formed on two opposite sides of the first connecting piece respectively, the first connecting column is inserted into the connecting pipeline, the second connecting column is inserted into the second connecting piece, and the plug pin is in insertion-connection with the second connecting piece.

2. The microfluidic detection system according to claim 1, wherein an end surface of an extended tip of the plug pin is a continuous and smooth hemispherical surface, and a pin hole of the plug pin for fluid communication with the sealed docking mechanism is formed on the circumferential side of a section of the plug pin located inside the sealed docking mechanism.

3. The microfluidic detection system according to claim 1, wherein a sealing ring for abutting contact or pressing contact with the plug pin is formed on the sealed docking mechanism, a through hole for the plug pin to pass through is formed in the middle of the sealing ring, and a sealing reinforcing rib protruding towards the radial inner side of the through hole is formed on the circumferential wall of the through hole.

4. The microfluidic detection system according to claim 1, wherein the outer wall of an end section of the plug pin for insertion into the sealed docking mechanism is tapered in an insertion direction of the plug pin; and the pin hole of the plug pin for fluid communication with the sealed docking mechanism is formed on the end surface of the extended tip of the plug pin.

5. The microfluidic detection system according to claim 1, wherein the plug pin is inserted into the microfluidic biochip through the communication port, and a starting end of the plug pin extending into the microfluidic biochip is open; and a matching interface between the plug pin and the communication port is sealed by sealing gum.

6. The microfluidic detection system according to claim 1, further comprising:
a chip mounting mechanism for fixing the microfluidic biochip after the plug pin and the sealed docking mechanism form a fluid-tight connection, such that the microfluidic biochip keeps a state of fluid-tight connection with the sample liquid driving device; and
an elastic pressing mechanism for applying an elastic acting force to the sealed docking mechanism, such that the sealed docking mechanism is elastically and hermetically docked with the sample liquid driving device and the microfluidic biochip at the same time.

7. The microfluidic detection system according to claim 6, wherein the elastic pressing mechanism is a spring, one end of the spring abuts against a fixedly arranged end plate, the other end of the spring abuts against the sealed docking mechanism, and the end plate and the microfluidic biochip are located on two opposite sides of the sealed docking mechanism respectively, such that the spring generates the elastic acting force towards the microfluidic biochip on the sealed docking mechanism.

8. The microfluidic detection system according to claim 7, further comprising:
a guide rod sleeved with the spring;
wherein one end of the guide rod is fixedly connected with the sealed docking mechanism, and the other end of the guide rod is in contact with a Hall switch after the plug pin and the sealed docking mechanism form the fluid-tight connection, such that the Hall switch is prompted to generate a trigger signal for indicating that the microfluidic biochip is mounted in place.

9. The microfluidic detection system according to claim 6, wherein the chip mounting mechanism comprises two oppositely arranged elastic clamping jaws, so as to apply opposite acting forces to the microfluidic biochip clamped between the two elastic clamping jaws; and
the microfluidic detection system further comprises a cantilever button which is suspended on one side of the microfluidic biochip, the cantilever button abuts against the inner sides of the two elastic clamping jaws at the same time, and acting forces which promote the elastic clamping jaws to elastically deform in directions of departing from each other are applied to the two elastic clamping jaws when the cantilever button is subjected to acting forces towards the elastic clamping jaws, so as to relieve the clamping effect of the two elastic clamping jaws on the microfluidic biochip.

10. The microfluidic detection system according to claim 1, further comprising:
a sample stage for placing a sample cup, the sample cup being used for containing sample liquid;
wherein the sample stage comprises a support stage for supporting the sample cup and an oscillator provided on the support stage, and the oscillator is used for oscillating the sample cup after the sample cup is placed on the support stage, such that buffer liquid and a sample in the sample cup are fully mixed to generate the sample liquid.

11. A refrigerator comprising the microfluidic detection system according to claim 1.

12. A microfluidic detection system for a refrigerator, comprising:
a microfluidic biochip that has a sample inlet, a communication port and a detection pool formed therein, wherein the sample inlet, the detection pool and the communication port communicate in sequence by means of a microfluidic channel;
a sample liquid driving device, which is in sealed communication with the communication port by means of a sealed docking mechanism, and is used to impel sample liquid in contact with the sample inlet to enter the microfluidic channel and flow to the detection pool by means of the microfluidic channel; and
a detection mechanism, which is used for detecting the detection pool so as to obtain a preset detection parameter of the sample liquid,
wherein the communication port of the microfluidic biochip is fixedly provided with a plug pin protruding and extending outward, an internal flow channel of the plug pin is in sealed communication with the communication port, and the plug pin is inserted into the inside of the sealed docking mechanism and forms a fluid-tight connection with the sealed docking mechanism, and the sealed docking mechanism is in fluid-tight connection with the sample liquid driving device, so that the sample liquid driving device is in sealed communication with the communication port;
wherein the microfluidic detection system further comprises:
a chip mounting mechanism for fixing the microfluidic biochip after the plug pin and the sealed docking mechanism form a fluid-tight connection, such that the microfluidic biochip keeps a state of fluid-tight connection with the sample liquid driving device; and an elastic pressing mechanism for applying an elastic acting force to the sealed docking mechanism, such that the sealed docking mechanism is elastically and hermetically docked with the sample liquid driving device and the microfluidic biochip at the same time.

13. The microfluidic detection system according to claim 12,
wherein the elastic pressing mechanism is a spring, one end of the spring abuts against a fixedly arranged end plate, the other end of the spring abuts against the sealed docking mechanism, and the end plate and the microfluidic biochip are located on two opposite sides of the sealed docking mechanism respectively, such that the spring generates the elastic acting force towards the microfluidic biochip on the sealed docking mechanism.

14. The microfluidic detection system according to claim 13, further comprising:
a guide rod sleeved with the spring;
wherein one end of the guide rod is fixedly connected with the sealed docking mechanism, and the other end of the guide rod is in contact with a Hall switch after the plug pin and the sealed docking mechanism form the fluid-tight connection, such that the Hall switch is prompted to generate a trigger signal for indicating that the microfluidic biochip is mounted in place.

15. The microfluidic detection system according to claim 12,
wherein the chip mounting mechanism comprises two oppositely arranged elastic clamping jaws, so as to apply opposite acting forces to the microfluidic biochip clamped between the two elastic clamping jaws; and
the microfluidic detection system further comprises a cantilever button which is suspended on one side of the microfluidic biochip, the cantilever button abuts against the inner sides of the two elastic clamping jaws at the same time, and acting forces which promote the elastic clamping jaws to elastically deform in directions of departing from each other are applied to the two elastic clamping jaws when the cantilever button is subjected to acting forces towards the elastic clamping jaws, so as to relieve the clamping effect of the two elastic clamping jaws on the microfluidic biochip.

* * * * *